US005234733A

United States Patent [19]

Schloegl et al.

[11] Patent Number: 5,234,733

[45] Date of Patent: Aug. 10, 1993

[54] HEAT-SEALABLE SHRINK FILM BASED ON POLYPROPYLENE

[75] Inventors: Gunter Schloegl, Kelkheim; Herbert Peiffer, Mainz-Finthen; Ursula Murschall, Nierstein; Lothar Bothe, Mainz-Gonsenheim; Guenther Crass, Taunusstein, all of Fed. Rep. of Germany

[73] Assignee: Hoechst Aktiengesellschaft, Frankfurt am Main, Fed. Rep. of Germany

[21] Appl. No.: 346,788

[22] Filed: May 3, 1989

[30] Foreign Application Priority Data

May 3, 1988 [DE] Fed. Rep. of Germany ....... 3814942

[51] Int. Cl.[5] ....................... B65D 65/40; B29C 47/14; B32B 27/08; B32B 27/32

[52] U.S. Cl. ................................ 428/36.91; 428/215; 428/349; 428/516; 428/910; 264/176.1

[58] Field of Search ..................... 428/36.91, 215, 349, 428/516, 910, 195

[56] References Cited

U.S. PATENT DOCUMENTS

| | | | |
|---|---|---|---|
| 3,666,836 | 5/1972 | John | 260/897 |
| 4,147,827 | 4/1979 | Breidt, Jr. et al. | 428/519 |
| 4,343,852 | 8/1982 | Isaka et al. | 428/216 |
| 4,419,411 | 12/1983 | Park | 428/516 |
| 4,456,646 | 6/1984 | Nishimoto et al. | 428/216 |
| 4,649,009 | 3/1987 | Shibata et al. | 264/235.8 |
| 4,766,178 | 8/1988 | Hwo | 525/240 |
| 4,769,421 | 9/1988 | Hwo | 525/240 |

OTHER PUBLICATIONS

Roder, "Schrumpfetikettierung-Technik und Anwendung," Verpackungs-Rundschau, Oct. 1983, pp. 1121-1122.

Patent Abstract, TORA, A97, 87-147803/21, JP2086-388-A, Nov. 10, 1985, JP224868.

Patent Abstract, 96:218923g, Jpn. Kokai Tokkyo Koho JP 82 15.958, Jan. 27, 1982, Appl. 80/91,354, Jul. 3, 1980.

*Primary Examiner*—P. C. Sluby
*Attorney, Agent, or Firm*—Foley & Lardner

[57] ABSTRACT

A shrink film which is comprised of a plurality of polyolefinic layers is disclosed. The base layer comprises polypropylene and a hydrogenated hydrocarbon resin admixture, and the top layers on each side of the base layer comprise polyolefinic sealable raw materials. The film possesses a shrinkability of more than 15% in the transverse direction and of less than 6% in the longitudinal direction, both measured at 90° C. Also disclosed is a process for manufacturing the film comprising coextrusion followed by stretching of the film in the longitudinal and transverse directions, whereby stretching in the longitudinal direction is performed such that the double refraction value $\Delta n$ of the longitudinally oriented film is not greater than $15 \times 10^{-3}$.

31 Claims, No Drawings

HEAT-SEALABLE SHRINK FILM BASED ON POLYPROPYLENE

BACKGROUND OF THE INVENTION

The present invention relates to a transparent shrinkable film comprising a base layer containing a mixture of polypropylene and hydrocarbon resin. The invention also relates to a process for manufacturing such a film and to a shrink label comprising the film.

It is known from "Verpackungsrundschau" [Packaging Review] to surround cylindrical or substantially cylindrical packages, such as bottles or cans with overall labels; these labels, which entirely surround the circumferential surface of the packages are also known as sleeves. The films used for this purpose are, for example, made from polyethylene, polybutylene, polystyrene, copolymers of polyethylene and polypropylene, copolymers of ethylene and vinyl acetate or various blends, but in particular from polyvinyl chloride. To achieve the desired shrink properties in the circumferential direction of the sleeves, which are essential for the intended use, the films usually are oriented by biaxial stretching which is performed, for example, using a bubble, stenter or calendar process, whereby particular attention is paid to the orientation in the transverse direction. To accomplish an absolutely crease-free, tight contact between the sleeve and the package, the shrink values measured after a treatment for about 15 minutes at 90° C. in a circulating air cabinet should be about 20 to 40% in the transverse direction ($s_t$) and about 7 to 8% in the longitudinal direction ($s_l$).

The sleeves are provided with prints, for example, by reverse side printing and then converted into a tubing by gluing or welding. Due to the controlled transverse shrink, a tight, crease-free contact is created between the tube and the package in the shrink tunnel. The sleeves are applied automatically with the aid of brushes or manually. In addition to the desired shrink the sleeves must possess the following properties: high gloss, clarity, good slip and stability (corresponding to the product of modulus of elasticity and thickness$^3$) for the automatic application of the sleeve, good printability and good welding/bonding characteristics.

For an economic large-scale manufacture of sleeves the use of heat-sealable films is of great advantage, for less time is required for sealing than for welding or gluing. Less material is required as well.

Among the known films, PVC films are the films which best fulfill the demands set forth above. Their high shrink capacities and their good optical and mechanical properties make them suitable for a great number of applications. The shape or diameter of a package can vary up to 30% or even more within the surface area to which the sleeve is to be applied.

The disadvantages of PVC sleeves re in particular their high price which mainly results from the high density of 1.39 kg/dm$^3$ (which is about 50% higher than the density of, for example, polypropylene), and their unsatisfactory heat sealability. Furthermore, problems are encountered with regard to corrosion of the manufacturing and processing apparatus (see EP-A-0 233 400).

EP-A-0 051 480 describes a heat-sealable film on a PVC basis. However, the production of this film is very expensive because it comprises five layers built up in the order of sequence ABCBA. The B-layer is an adhesion-promoting layer comprising an ethylene/vinyl acetate copolymer.

It is also known to use blends based on olefinic homo-, co- and terpolymers for producing sleeves, apart from PVC. Japanese Application JP-A-22 4 868 (Toray) discloses, for example a heat-shrinkable multilayer film based on polypropylene and having the layer build-up configuration AB or ABA. Layer A is comprised of a random ethylene/propylene copolymer and layer B is a blend of a random ethylene/propylene copolymer and a propylene/butylene copolymer. The film is said to have a shrink $s_t$, in the circumferential direction of the sleeve of 15% or more at 100° C., and furthermore is sealable due to the selected layer build-up. However, the mechanical strength of this film is quite poor. For example, PVC has a modulus of elasticity in the longitudinal direction ($E_l$) of about 2,600 to 2,900 N/mm$^2$ and in the transverse direction ($E_t$) of about 3,500 to 3,800 N/mm$^2$, whereas for the polyolefinic films $E_l$ is only about 100 to 1,100 N/mm$^2$ and $E_t$ is only about 100 to 1,500 N/mm$^2$. To achieve mechanical strength values which come up to those of PVC films, the thickness of the polyolefinic film has to be increased by about 50%, which in turn leads to correspondingly higher costs. Further disadvantages of the polyolefinic film according to JP-A-224 868 compared to PVC are its lower gloss and higher haze.

From EP-A-0 171 733 films of the type described above are known which consist of copolymers of propylene with other alpha-olefins and a resin admixture and which possess acceptable shrink values. However, the mechanical properties of the disclosed films are not satisfactory, and they are not sealable.

SUMMARY OF THE INVENTION

Accordingly, it is an object of the present invention to provide a transparent, heat-sealable and shrinkable multilayer film comprising polypropylene, which can be used for sleeves and which possesses good optical and excellent mechanical properties.

Another object of the present invention is to provide a film which is more economically produced than known films.

A further object of the present invention is to provide a process for producing the film described above.

In accomplishing the foregoing objectives, there has been provided, in accordance with one aspect of the present invention, a transparent shrinkable film which comprises (a) a base layer comprising about 60 to 95% by weight of a propylene polymer and about 5 to 40% by weight of a hydrogenated hydrocarbon resin having a softening point of about 80° to 125° C., wherein all percentages are based on the total weight of the base layer, and (b) a heat-sealable top layer on each of the two surfaces of the base layer, which comprises a homo-, co- or terpolymer of one or more alpha-olefins having 2 to 4 carbon atoms or a mixture thereof, wherein the heat-sealable layers have a lower melting point than the base layer.

In accordance with another aspect of the present invention there is provided a process for the manufacture of the described film, comprising the steps of producing a prefilm by coextrusion through a slot die, solidifying the prefilm on a chilling roll and subsequently orienting the resulting film by stretching it in the longitudinal and in the transverse directions.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

DETAILED DESCRIPTION OF PREFERRED EMBODIMENTS

The propylene polymer contained in the base layer is an isotactic polypropylene having an n-heptane-soluble fraction of 10% by weight or less, polypropylenes with an n-heptane-soluble fraction of 2 to 6% by weight being particularly preferred.

The melt flow index (MFI) of the propylene polymer of the base layer, determined in accordance with DIN 53 735 at 230° C. and under a load of 2.16 kp, varies between 0.5 g/10 min and 8 g/10 min, in particular between 1.5 g/10 min and 4 g/10 min.

The hydrocarbon resin, which in accordance with this invention is contained in the base layer, is a low molecular-weight synthetic resin. Its softening point, determined according to DIN 1995-U4, preferably is in the range from about 85° C. to 110° C. Hydrocarbon resins of this type are usually prepared from resin-forming compounds, such as styrene, methyl styrene, vinyl toluene, indene, pentadiene, cyclopentadiene and the like. In accordance with this invention, preference is given to hydrogenated resins, in particular to hydrogenated cyclopentadiene resins. Their Saybolt number (acc. to ASTM-D158) is greater than 20, preferably greater than 25.

The sealing layers of the shrink film according to this invention are comprised of sealable olefinic polymers. Suitable olefinic polymers are ethylene homopolymers, copolymers of ethylene and propylene, copolymers of ethylene or propylene and butylene or another alpha-olefin having 5 to 10 carbon atoms, terpolymers of ethylene, propylene and butylene or another alpha-olefin having 5 to 10 carbon atoms, and mixtures of several of these polymers. Ethylene/propylene copolymers, ethylene/butylene copolymers, propylene/butylene copolymers, ethylene/propylene/butylene terpolymers or mixtures of these polymers are preferably employed. Olefinic polymers which are particularly preferably used for the sealing layers are ethylene/propylene copolymers with propylene as the main constituent and an ethylene content of about 2 to 10% by weight (relative to the weight of the copolymer), propylene/butylene copolymers with propylene as the main constituent and a butylene content of about 0.5 to 25% by weight (relative to the weight of the copolymer), and ethylene/-propylene/butylene terpolymers with propylene as the main constituent, about 0.5 to 7% by weight of ethylene and about 5 to 30% by weight of butylene (each time relative to the weight of the terpolymer), and mixtures of these polymers. The co- and terpolymers are random polymers.

The olefin polymer used for the sealing layers has a lower melting point than the propylene polymer of the base layer. The MFI of the olefinic polymer or of the olefinic polymer mixture, respectively is higher than that of the propylene polymer of the base layer. The olefinic polymer or polymer mixture, respectively, used for the sealing layers in general has an MFI of between 1 g/10 min and 12 g/10 min, preferably between 3 g/10 min and 9 g/10 min, measured at 230° C. and under a load of 2.16 kp (acc. to DIN 53 735).

In order to further improve certain properties of the polyolefinic film according to this invention, effective amounts of appropriate additives, such as antistatic agents, slip agents or lubricants, may be contained in the base layer and in the two sealing layers.

Preferred antistatic agents include alkali alkane sulfonates and essentially straight-chain, saturated aliphatic tertiary amines possessing aliphatic radicals with 10 to 20 carbon atoms and being substituted by 2-hydroxyalkyl-($C_1$ to $C_4$) groups. Preferred amines are N,N-bis-(2-hydroxyethyl)-alkylamines having 10 to 20, preferably 12 to 18, carbon atoms in their alkyl groups. The effective amount of antistatic agent varies in the range from about 0.05 to 3% by weight, relative to the weight of the layer.

It has found to be particularly advantageous to add to the base layer about 0.1 to 0.3% by weight of an N,N-bisethoxyalkylamine with an aliphatic radical having 10 to 20 carbon atoms.

In another preferred embodiment, at least one sealing layer contains about 0.1 to 0.8% by weight, preferably 0.15 to 0.3% by weight, of a slip agent having an average particle size of about 0.5 to 3 μm, preferably of 1 to 2 μm.

Suitable slip agents include inorganic additives, such as silicon dioxide, calcium carbonate, magnesium silicate, aluminum silicate, calcium phosphate, and the like, and/or incompatible organic polymers, such as polyamides, polyesters, polycarbonates and the like. Silicon dioxide and calcium carbonate are preferably employed as slip agents.

Examples of suitable lubricants include higher aliphatic acid amides, higher aliphatic acid esters, waxes, metallic soaps and polydimethylsiloxane. The effective added amount of lubricant varies between about 0.1 and 2% by weight, relative to the weight of the layer. The addition of 0.15 to 0.25% by weight of a higher aliphatic acid amide (e.g., erucic acid amide) to the base layer has found to be very advantageous. Good results are also achieved when polydimethylsiloxane is added to the sealing layer which is not subjected to a surface treatment. In this case, the added amount expediently varies between about 0.5 and 1.5% by weight, and the polydimethylsiloxane employed has a viscosity of between about 1,000 and 100,000 $mm^2/s$.

The film according to this invention has a thickness of between about 15 and 50 μm, preferably of 20 to 45 μm, wherein the sealing layers have a thickness of about 0.5 to 1.0 μm each.

The film according to the present invention is distinguished by an extraordinarily high shrinkability in the transverse direction, even at relatively low temperatures (90° C.) and simultaneously possesses an extraordinarily low shrinkability in the longitudinal direction. In particular, the shrink of the film in the transverse direction is higher than 15% at 90° C. and higher than 35% at 120° C., and the shrink in the longitudinal direction is less than 6% at 90° C. and less than 15% at 120° C., whereby the percentages are in each case related to the dimensions of the film prior to the shrinking treatment The shrink values were in each case determined in a circulating air cabinet during 15 minutes, in accordance with DIN 406 34. The film according to the invention preferably has shrink values, in the transverse direction, of 15% to 22% at 90° C. and of 35% to 45% at 120° C., and the preferred shrink values in the longitudinal direction are 2% to 6% at 90° C. and 8% to 15% at 120° C., each time related to the dimensions of the film prior to the shrink treatment.

Apart from these excellent shrink properties, the film according to this invention also possesses very desirable mechanical properties. The modulus of elasticity is determined by means of a tensile strength tester, type No. 1445, from Messrs. Zwick, Ulm, West Germany, in accordance with DIN 53 455. Employing this method, the moduli of elasticity determined for the film of this invention are more than about 2,000 N/mm$^2$, preferably between 2,200 and 2,600 N/mm$^2$, in the longitudinal direction and more than about 4,000 N/mm$^2$, preferably between 4,500 N/mm$^2$ and 5,500 N/mm$^2$, in the transverse direction.

Another physical parameter used to express the physical properties of the film is the tensile strength which is also determined according to DIN 53 455. The shrink film of this invention possesses a tensile strength of more than about 130 N/mm$^2$, preferably in the range from 145 to 185 N/mm$^2$, in the longitudinal direction, and of more than about 220 N/mm$^2$, preferably in the range from 235 to 290 N/mm$^2$, in the transverse direction.

The optical properties of the film of this invention are also surprisingly good. The gloss value is in the range of about 95 to 110, determined in accordance with DIN 67 530 or ASTM-D 523, respectively, and the haze of the film is about 20% to 30%, determined in a way similar to the method of ASTM-D 1003-52. In lieu of a 4° round aperture diaphragm, a 1° slot aperture diaphragm is used, and the haze in percent, is stated for four superimposed film layers which were selected to exploit the optimum measuring range.

In the process according to the invention the conditions for the longitudinal stretching are set such that the degree of orientation in the longitudinal direction is low. These are very favorable preconditions for achieving a high shrinkage in the transverse direction and a low shrinkage in the longitudinal direction. A customary measure for evaluating the degree of orientation of the film stretched in the longitudinal direction is the double refraction $\Delta n$. In accordance with this invention the double refraction index n of the film stretched in the longitudinal direction, but not yet stretched in the transverse direction does not exceed about $12\times10^{-3}$ to $15\times10^{-3}$. Preferably, the double refraction index $\Delta n$ should be less than $10\times10^{-3}$. Stretching in the longitudinal direction is performed at a temperature above about 130° C., preferably between 135° and 150° C., and at a stretching ratio of less than about 4.5, preferably in the range of 3 to 4.

Surprisingly, it has been discovered that under these conditions the temperature for transverse stretching $T_t$ can be selected considerably below the customary temperatures, without any adverse effect on the film processing properties. In accordance with this invention, stretching in the transverse direction is performed at a temperature of less than about 130° C., preferably of less than 120° C. According to the invention, the stretching ratio in the transverse direction is more than about 7.5, and preferably it is in the range from 8 to 11.

The stretching of the film in the transverse direction is followed by a final setting step. During this step, the film is conveyed in a stenter frame, optionally in a slightly converging manner, whereby the temperature is kept about 20° to 40° C. below the stretching temperature. In particular, the temperature is below 110° C., and most preferably it is below 80° C. The frame convergence during the setting step preferably is about 5% to 15%.

Printability of the film is achieved by subjecting the film to any one of the customary surface treatments, for example, a flame treatment or an electrical corona treatment, prior to the winding step.

Corona treatments are expediently performed such that the film is passed between two conductive elements serving as electrodes, whereby a high voltage, in general an alternating voltage (about 10,000 V and 10,000 Hz), is applied to the electrodes, the voltage being sufficient to initiate spray or corona discharges. By these spray or corona discharges the air above the film surface is ionized and combines with the molecules present on the film surface, so that polar inclusions are obtained in the essentially unpolar polymer matrix.

The treatment intensities are within the customary limits. Preference is given to intensities between about 38 and 42 mN/m.

The prints on the film are usually produced by reverse side printing.

The shrink film manufactured in this way possesses a combination of properties which makes it highly suitable for its intended use as a film for sleeves. A particularly preferred field of application is the packaging of cans or bottles, where the dimensional changes in the areas to be surrounded by sleeves are below 15% to 20%.

The film according to the invention will be further illustrated by means of the Example which follows.

EXAMPLE

| | | | |
|---|---|---|---|
| A) | Base layer: | 89.6% | by weight (b.w.) of an isotactic polypropylene, |
| | | 10.0% | b.w. of a hydrogenated cyclopentadiene resin having a softening temperature of 90° C., |
| | | 0.2% | b.w. of N,N-bis-ethoxy-alkylamine, and |
| | | 0.2% | b.w. of erucic acid amide. |
| B) | Top layer: | Mixture, in a ratio of 1:1, of | |
| | | a) | a random ethylene/propylene/1-butene terpolymer having a $C_2$ content of 1.4% b.w., a $C_3$ content of 95.8% b.w. and a $C_4$ content of 2.8% b.w., and |
| | | b) | a random propylene/1-butene copolymer having a $C_4$ content of 66.8% b.w. |

The mixture B has a MFI of 8 g/10 min. The sealing layer mixture further contains 0.2% by weight of calcium carbonate, having an average particle size of 2 μm. as a slip agent.

This ABA film is manufactured by the process steps comprising coextrusion, chilling, longitudinal stretching, transverse stretching, and heat-setting. The total film thickness is 30 μm, the sealing layers have a thickness of 0.7 μm each. The following process conditions are set for the individual steps:

| | | |
|---|---|---|
| Extrusion: | Temperature A layers | 230° C |
| | Temperature B layer | 270° C |
| | Temperature of chilling roll | 30° C |
| Longitudinal stretching: | Temperature = 140° C. | |
| | Stretching ratio = 4.0 | |
| Transverse stretching: | Temperature = 115° C. | |
| | Stretching ratio = 11 | |

-continued

| Setting: | Temperature = 70° C. Duration = 1 s |
|---|---|

The film produced in this way has the properties listed in the last line of the Table below. Prior to winding, the film was subjected to a corona treatment, in order to ensure good printability. The treatment intensity was 40 mN/m.

In the Table, the film according to this invention is compared to a PVC film, to films produced in accordance with two prior Japanese patent publications, and to a polypropylene film produced under substantially the same conditions as the film according to this invention, but without the resin admixture and without top layers. A comparison of the properties specified in the Table shows that the film of this invention is superior to all known films, particularly with regard to the combination of properties constituting an object of this invention.

TABLE

| | Examples | | | | | | | | | |
|---|---|---|---|---|---|---|---|---|---|---|
| | Shrink [%] 15 min. hot air transv./longit. | | Modulus of elasticity ($N/mm^2$) | | Tear strength $\frac{[N]}{mm^2}$ | | | | | Thickness at same stiffness |
| Film/Properties | 90° C. | 120° C. | longit. | transv. | longit. | transv. | Haze [%] | Gloss | Density [$kg/m^3$] | [μm] |
| PVC | 50/6 | 52/6 | 2700 | 3700 | 60 | 110 | 5 | 120 | 1390 | ~30 |
| JP 91 354 | 20/3 | 58/7 | <1000 | ~1000 | <50 | ~100 | ~30 | ~100 | ~900 | 45 |
| JP 224 868 | 15/4 | 30/8 | <1000 | ~1000 | <50 | ~100 | ~30 | ~100 | ~900 | 45 |
| Polypropylene | 10/6 | 20/9 | 2200 | 4500 | 170 | 300 | 30 | 105 | 900 | ~31 |
| Film of this invention | 20/6 | 37/10 | 2300 | 4700 | 160 | 250 | 25 | 105 | 900 | 30 |

What is claimed is:

1. A transparent shrinkable film having a higher shrinkability in the transverse direction than in the longitudinal direction, which comprises:
   (a) a base layer comprising about 60 to 95% by weight of a propylene polymer and about 5 to 40% by weight of a hydrogenated hydrocarbon resin having a softening point of about 80° to 125° C., wherein all percentages are based on the total weight of the base layer, and
   (b) a heat-sealable top layer on each of the two surfaces of said base layer, which comprises a homo-, co- or terpolymer of one or more alpha-olefins having 2 to 4 carbon atoms or a mixture thereof, wherein said heat-sealable layers have a lower melting point than said base layer.

2. The film as claimed in claim 1, wherein said hydrogenated hydrocarbon resin is a low molecular-weight synthetic resin having a softening point of about 85° to 110° C.

3. The film as claimed in claim 2, wherein said hydrogenated hydrocarbon resin is a hydrogenated cyclopentadiene resin.

4. The film as claimed in claim 1, wherein said heat-sealable top layers comprise an ethylene homopolymer, a copolymer of ethylene and propylene, a copolymer of ethylene or propylene and butylene or another alpha-olefin having 5 to 10 carbon atoms, a terpolymer of ethylene, propylene and butylene or another alpha-olefin having 5 to 10 carbon atoms, or a mixture of two or more of said polymers.

5. The film as claimed in claim 4, wherein said top layers comprise ethylene/propylene copolymers, ethylene/butylene copolymers, propylene/butylene copolymers, ethylene/propylene/butylene terpolymers or mixtures of said polymers.

6. The film as claimed in claim 1, having a thickness of 15 to 50 μm, with the top layers being 0.5 to 1.0 μm thick.

7. The film as claimed in claim 6, having a thickness of 20 to 45 μm.

8. The film as claimed in claim 1, having a shrinkability in the transverse direction of more than 15% at 90° C. and of more than 35% at 120° C., and a shrinkability in the longitudinal direction of less than 6% at 90° C. and of less than 15% at 120° C., the percentages being in each case related to the shrink process.

9. The film as claimed in claim 8, having a shrinkability in the transverse direction of 15 to 22% at 90° C. and of 35 to 45% at 120° C., and a shrinkability in the longitudinal direction of 2 to 6% at 90° C. and 8 to 15% at 120° C.

10. The film as claimed in claim 1, having a modulus of elasticity in the longitudinal direction of more than about 2,000 $N/mm^2$ and a modulus of elasticity in the transverse direction of more than about 4,000 $N/mm^2$.

11. The film as claimed in claim 10, having a modulus of elasticity in the longitudinal direction of 2,200 to 2,600 $N/mm^2$.

12. The film as claimed in claim 10, having a modulus of elasticity in the transverse direction of 4,500 $N/mm^2$ to 5,500 $N/mm^2$.

13. The film as claimed in claim 1, having a tear resistance in the longitudinal direction of more than 130 $N/mm^2$ and a tear resistance in the transverse direction of more than 220 $N/mm^2$.

14. The film as claimed in claim 13, having a tear resistance in the longitudinal direction of 145 to 185 $N/mm^2$.

15. The film as claimed in claim 13, having a tear resistance in transverse direction of 235 to 290 $N/mm^2$.

16. The film as claimed in claim 1, wherein said base film further comprises an antistatic agent.

17. The film as claimed in claim 1, wherein said base layer further comprises a lubricant.

18. The film as claimed in claim 1, wherein at least one of said sealing layers further comprises a slip agent.

19. The film as claimed in claim 1, wherein said propylene polymer is an isotactic polypropylene having an n-heptane-soluble fraction of 10% by weight or less.

20. The film as claimed in claim 1, wherein said propylene polymer is an isotactic polypropylene having an n-heptane-soluble fraction of 2 to 6% by weight or less.

21. The film as claimed in claim 1, wherein said propylene polymer is an isotactic polypropylene having an n-heptane-soluble fraction of 10% by weight or less and a melt flow index of 0.5 to 8 g/10 min.

22. The film as claimed in claim 1, wherein the hydrogenated hydrocarbon resin has a Saybolt number of greater than 25.

23. The film as claimed in claim 1, wherein said base layer further comprises about 0.1 to 0.3% by weight of an N,N-bisethoxyalkylamine with an aliphatic radical having 10 to 20 carbon atoms.

24. The film as claimed in claim 1, wherein at least one of the sealing layers contains 0.1 to 0.8% by weight of a slip agent having an average particle size of about 0.5 to 3 micrometers.

25. The film as claimed in claim 24, wherein said slip agent is silicon dioxide or calcium carbonate.

26. The film as claimed in claim 1, wherein said base layer comprises 0.15 to 0.25% by weight of a higher aliphatic acid amide.

27. The film as claimed in claim 1, wherein said base layer comprises 0.5 to 1.5% by weight of a polydimethylsiloxane having a viscosity of between about 1,000 and 100,000 $mm^2/s$.

28. The film as claimed in claim 1, wherein the film has a gloss value in the range of about 95 to 110 and a haze of about 20% to 30%.

29. The film as claimed in claim 1, wherein at least one of the top layers has been treated by flame treatment or corona treatment, and wherein the treated layer has then been printed.

30. A sleeve comprising a film as claimed in claim 1.

31. A packaging product comprising a substantially cylindrical package and a sleeve as claimed in claim 30.

* * * * *

UNITED STATES PATENT AND TRADEMARK OFFICE

CERTIFICATE OF CORRECTION

PATENT NO. : 5,234,733

DATED : August 10, 1993

INVENTOR(S) : Gunter SCHLOEGL et al.

It is certified that error appears in the above-indentified patent and that said Letters Patent is hereby corrected as shown below:

Claim 8, column 8, line 13, "each case related to the shrink process" should read --each case related to the dimensions of the film prior to the shrink process--.

Signed and Sealed this

Third Day of May, 1994

Attest:

BRUCE LEHMAN

Attesting Officer

*Commissioner of Patents and Trademarks*